(12) United States Patent
Chang et al.

(10) Patent No.: US 7,366,326 B2
(45) Date of Patent: Apr. 29, 2008

(54) REAL-TIME IMPLEMENTATION OF FIELD PROGRAMMABLE GATE ARRAYS (FPGA) DESIGN IN HYPERSPECTRAL IMAGING

(75) Inventors: Chein-I Chang, Ellicott City, MD (US); Jianwei Wang, San Jose, CA (US)

(73) Assignee: University of Maryland, Baltimore County, Baltimore, MD (US)

( * ) Notice: Subject to any disclaimer, the term of this patent is extended or adjusted under 35 U.S.C. 154(b) by 557 days.

(21) Appl. No.: 10/875,102

(22) Filed: Jun. 24, 2004

(65) Prior Publication Data
US 2005/0015418 A1 Jan. 20, 2005

Related U.S. Application Data

(60) Provisional application No. 60/482,150, filed on Jun. 24, 2003.

(51) Int. Cl.
*G06K 9/00* (2006.01)
(52) U.S. Cl. ............ 382/107; 716/16; 359/337.1; 356/303
(58) Field of Classification Search ........ 382/100, 382/103, 106, 107; 250/227.23; 356/303; 716/16; 359/337.1
See application file for complete search history.

(56) References Cited

U.S. PATENT DOCUMENTS 6,693,970 B2 * 2/2004 Vankka .............. 375/261

7,031,992 B2 * 4/2006 Khan et al. ............. 708/276
2006/0282489 A1 * 12/2006 Khan et al. ............. 708/422
2006/0285531 A1 * 12/2006 Howard et al. .......... 370/343

OTHER PUBLICATIONS

Andraka (Andraka, Ray; "A survey of Cordic algorithms for FPGA based computers;" Andraka Consulting Group, Inc.; From Google; 1998).*
Ma et al. (Ma, Jun; Parhi, Keshab; Deprettere, Ed; "High-Speed Cordic Based Parallel Weight Extraction For QRD-RLS Adaptive Filtering," Dept. of Electrical and Computer Engineering, University of Minnesota, Minneapolis and Dept. of Electrical Engineering, Delft University of Technology, 2628 CD Delft, The Netherlands; IEEE; 1998).*

* cited by examiner

*Primary Examiner*—Bhavesh M. Mehta
*Assistant Examiner*—Anand Bhatnagar
(74) *Attorney, Agent, or Firm*—Sughrue Mion, PLLC

(57) ABSTRACT

A Field Programmable Gate Arrays (FPGA) design uses a Coordinate Rotation DIgital Computer (CORDIC) algorithm that can convert a Givens rotation of a vector to a set of shift-add operations. The CORDIC algorithm can be easily implemented in hardware architecture, therefore in FPGA. Since the computation of the inverse of the data correlation matrix involves a series of Givens rotations, the utility of the CORDIC algorithm allows a causal Constrained Energy Minimization (CEM) to perform real-time processing in FPGA. An FPGA implementation of the causal CEM is described and its detailed architecture is also described.

24 Claims, 19 Drawing Sheets

500

600

700

REAL-TIME IMPLEMENTATION OF FIELD PROGRAMMABLE GATE ARRAYS (FPGA) DESIGN IN HYPERSPECTRAL IMAGING

CROSS REFERENCE TO RELATED APPLICATIONS

This application claims the benefit of U.S. Provisional Application No. 60/482,150, filed on Jun. 24, 2003 in the United States Patent and Trademark Office, the disclosure of which is hereby incorporated by reference.

BACKGROUND OF THE INVENTION

1. Field of the Invention

The present invention relates to a Field Programmable Gate Arrays (FPGA) design and implementation, and more particularly to utilizing a Coordinate Rotation DIgital Computer (CORDIC) algorithm that allows a causal Constrained Energy Minimization (CEM) to perform real-time processing in FPGA for hyperspectral processing.

2. Description of the Related Art

The importance of real-time processing has been recently realized and recognized in many applications. In some applications, e.g. on-board spacecraft data processing system, it is very useful to have high levels of processing throughput. Specifically, as spacecraft instruments generate data at an ever-increasing speed, on-board science data processing has been largely absent from remote sensing missions. Many advantages can result from real-time processing. One is the detection of moving targets. This is critical and crucial on a battlefield when moving targets such as tanks or missile launching vehicles pose a real threat to ground troops. The real-time data processing provides timely intelligence information which can help to reduce casualties. Another advantage is on-board data processing. For space-borne satellites, real-time data processing can significantly reduce mass storage of data volume. A third advantage is chip design. Real-time processing can be implemented in parallel and reduce computational loads. Furthermore, it can also reduce payload in aircrafts and satellites. Over the past years, many subpixel detection and mixed pixel algorithms have been developed and shown to be very versatile. However, their applicability to real-time processing problem is generally restricted by very complex computational workloads.

SUMMARY OF THE INVENTION

The present invention addresses the aforementioned problems. An object of the present invention is to provide a system and method capable of performing real-time processing of Constrained Energy Minimization (CEM).

Another object of the present invention is to provide a system and method for providing Field Programmable Gate Arrays (FPGA) utilizing a Coordinate Rotation Digital Computer (CORDIC) algorithm the allows a causal CEM to perform real-time processing in FPGA.

A further object of the present invention is to utilize the CORDIC to convert Givens rotations to a series of shifts-adds to use to decompose a matrix into triangular matrices that can be implemented in real time.

To achieve these and other advantages and in accordance with the purpose of the present invention, as embodied and broadly described herein, there is provided an exemplary embodiment of a method of implementing field programmable gate arrays comprising: converting a Givens rotation of a vector to a set of operations; wherein a coordinate rotation digital computer algorithm is used for said converting.

Consistent with another aspect of the present invention, there is provided another exemplary embodiment of a method of implementing field programmable gate arrays for hyperspectral detection and classification comprising: applying a coordinate rotation digital computer algorithm to received data to generate an upper triangular matrix by Givens rotation; applying backsubstitution to said generated upper triangular matrix to obtain an inverse of said upper triangular matrix; and applying finite impulse response filtering to current input pixel streams to generate an output; wherein said generated output indicates a detected target signature.

Consistent with a still further aspect of the present invention, there is provided another exemplary embodiment of a method of and an apparatus for implementing field programmable gate arrays for hyperspectral detection and classification, comprising: performing Givens rotation on an input pixel stream to generate an upper triangular matrix; applying backsubstitution to said generated upper triangular matrix to obtain an inverse of said upper triangular matrix; transposing said inverse of said upper triangular matrix using distributed arithmetic; obtaining a filter weight vector; and applying finite impulse response filtering to current input pixel streams to generate an output; wherein a coordinate rotation digital computer algorithm is used to perform the Givens rotation by a series of operations, and said generated output indicates a detected target signature.

Consistent with a still further aspect of the present invention, there is provided another exemplary embodiment of a method of and an apparatus for implementing field programmable gate arrays for hyperspectral detection and classification comprising: generating a correlation matrix R from an input pixel stream; applying a coordinate rotation digital computer algorithm to convert a matrix [R|d] to an upper triangular matrix by Givens rotation, where d is a desired target signature; applying backsubstitution to said upper triangular matrix to obtain filter coefficients; and applying finite impulse response filtering to current input pixel streams to generate an output; wherein said correlation matrix is updated every time a new pixel arrives, and said generated output indicates a detected target signature.

The foregoing and other objects, features, aspects and advantages of the present invention will become more apparent from the following detailed description of the present invention when taken in conjunction with the accompanying drawings.

BRIEF DESCRIPTION OF THE DRAWINGS

The above and other aspects, features and advantages of the present invention will become apparent from the following description of exemplary embodiments given in conjunction with the accompanying drawings, in which.

DETAILED DESCRIPTION OF THE PREFERRED EMBODIMENT

Figure 1:
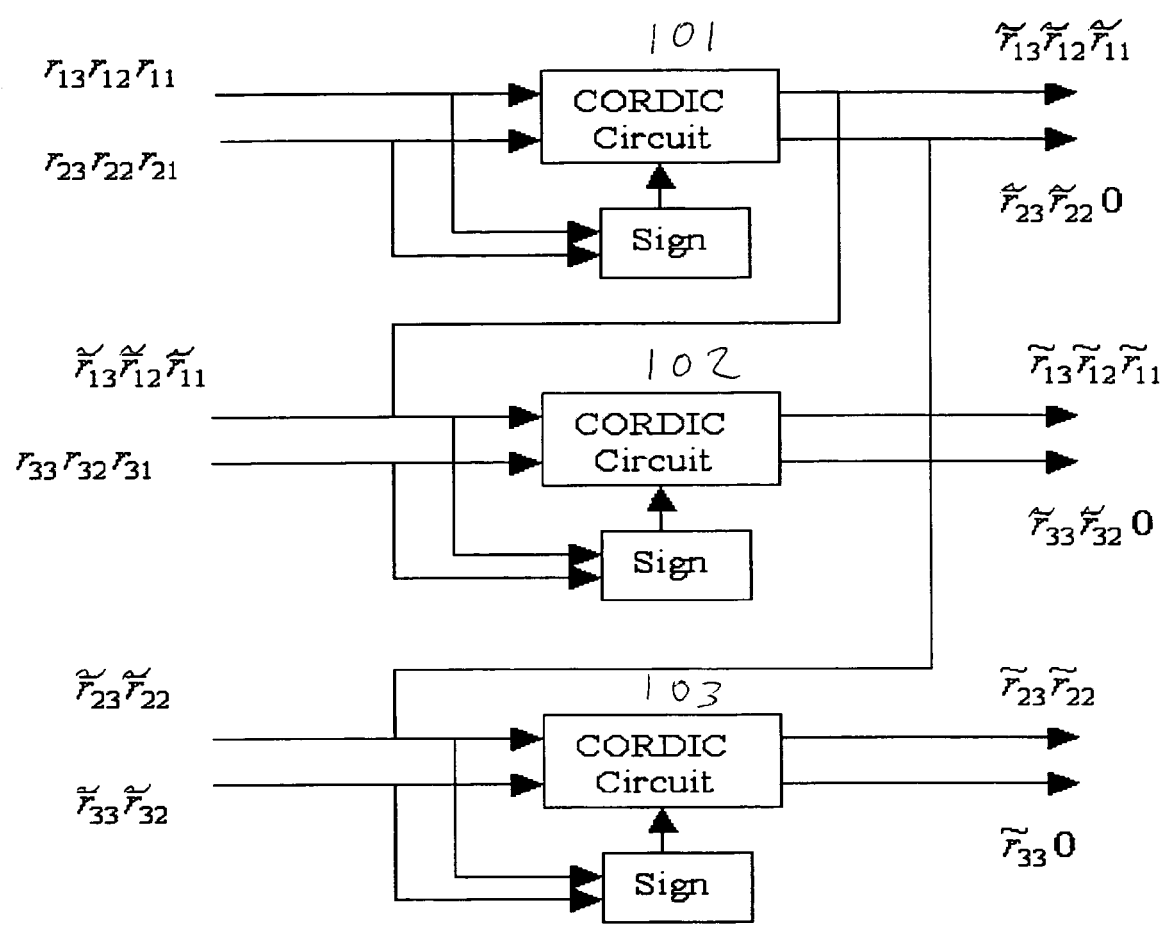
FIG. 1 illustrates a systolic array for QR decomposition consistent with an embodiment of the present invention.

Various embodiments of the present invention use a Field Programmable Gate Arrays (FPGA) design for real-time implementation of a hyperspectral detection and classification algorithm, called constrained energy minimization (CEM), for hyperspectral data exploitation. CEM is discussed by J. C. Harsanyi in the dissertation entitled *Detection and Classification of Subpixel Spectral Signatures in Hyperspectral Image Sequences*. The issue of the real-time processing for CEM was also studied in the article "Real-time processing algorithms for target detection and classification in hyperspectral imagery," by C.-I Chang, H. Ren and S. S. Chiang, where its systolic array implementation was developed. In recent years, rapid advances in VLSI technology have had a large impact on modern digital signal processing. Over the past thirty years, the number of transistors per chip has doubled about once a year. Therefore, VLSI design of complex algorithms have become more and more feasible. The major difficulty with implementing these algorithms in real time is the computation of the inverse of a data correlation matrix performed in the CEM, which requires a complete set of data samples. In order to cope with this problem, the data correlation matrix must be calculated in a causal manner which only needs data samples up to the sample at the time it is processed. Systolic arrays provide a possibility, but requires a series of Givens rotations to decompose a matrix into triangular matrices that can be implemented in real time. Unfortunately, such Givens rotations cannot be realized in hardware. In order to resolve this issue, the Givens rotations must be performed by operations such as adds, ORs, XORs, shifts that can be realized in hardware architecture. In order to do so, the COordinate Rotation DIgital Computer (CORDIC) algorithm developed by J. E. Volder "The CORDIC trigonometric computer technique," which allows the conversion of a Givens rotation to a series of shifts-adds operations, is used. Using systolic arrays architecture in conjunction with the CORDIC algorithm, the computation of a matrix inverse can be implemented in a set of shifts-adds operations. As a result, the FPGA design of CEM is made possible, leading to implementation for chip fabrication. The detailed FPGA design layout for a causal CEM will be described in detail.

Assume that a remotely sensed image is a collection of image pixels denoted by $\{r_1, r_2, \ldots, r_N\}$ where $r_i = (r_{i1}, r_{i2}, \ldots, r_{iL})^T$ for $1 \leq i \leq N$ is an L-dimensional pixel vector, N is the total number of pixels in the image, and L is the total number of spectral channels. Suppose that $d = (d_1, \ldots, d_L)^T$ is the desired target signature of interest in the image. The goal is to design a finite impulse response (FIR) linear filter specified by L filter coefficients $\{w_1, w_2, \ldots w_L\}$, denoted by an L-dimensional vector $w = (w_1, \ldots, w_L)^T$ that can be used to detect the signature d without knowing the image background. Assuming that $y_i$ is the output of the designed FIR filter resulting from the input $r_i$, then $y_i$ can be expressed by $$y_i = \Sigma_{l=1}^{L} w_l r_{il} = r_i^T w = w^T r_i. \quad (1)$$

In order to detect the desired target signature d using the filter output $y_i$, the FIR filter must be constrained by the following equation $$d^T w = 1, \text{ i.e, } d^T w = \Sigma_{l=1}^{L} d_l w_l = 1 \text{ for } 1 \leq j \leq k \quad (2)$$

so that the d can pass through the filter, while the output energies resulting from other signatures will be minimized. This problem is a linearly constrained adaptive beamforming problem, called minimum variance distortionless response (MVDR) which can be cast as follows:

$$\min_w \{w^T R_{L \times L} w\} \text{ subject to the constraint } d^T w = 1 \quad (3)$$

where $R_{L \times L} = (1/N)[\Sigma_{i=1}^{N} r_i r_i^T]$ is the autocorrelation sample matrix of the image and $$\frac{1}{N}\left[\sum_{i=1}^{N} y_i^2\right] = \frac{1}{N}\left[\sum_{i=1}^{N} (r_i^T w)^T r_i^T w\right] = w^T\left(\frac{1}{N}\left[\sum_{i=1}^{N} r_i r_i^T\right]\right) w = w^T R_{L \times L} w. \quad (4)$$

The solution to Eq. (4) can then be obtained, such that $$w^* = \frac{R_{L \times L}^{-1} d}{d^T R_{L \times L}^{-1} d}. \quad (5)$$

The filter specified by the optimal weight vector $w^*$ is the constrained energy minimization (CEM).

One significant advantage of the CEM is that the correlation matrix $R_{L \times L}$ in the optimal weights specified by Eq. (5) can be decomposed into a product of a unitary matrix Q and an upper triangular matrix R by either the Givens rotations or the Householder transform. Such a decomposition is commonly referred to as QR-decomposition. Another advantage is that the CEM can be implemented in real time where the correlation matrix can be carried out either line-by-line or pixel-by-pixel from left to right and top to bottom. For illustrative purpose, it is assumed that the correlation matrix is performed line-by-line and at each line t a data matrix $X_t = [r_{t1}, r_{t2}, \ldots r_{tN}]$ is formed up to this particular line. In this case, the $R_{L \times L}$ in Eq. (3) is replaced by the data autocorrelation matrix of line t in the image, denoted by $\Sigma_t$, whereby $$\sum_t = \frac{1}{N}\left[\sum_{i=1}^{N} r_{ti} r_{ti}^T\right] = \frac{1}{N}[X_t X_t^T]. \quad (6)$$

With QR-decomposition, $X_t$ can be expressed by $$X_t = Q_t R_t \quad (7)$$

Here, $Q_t$ is a unitary matrix with $Q_t^{-1} = Q_t^T$ and $$R_t = \begin{bmatrix} R_t^{upper} \\ 0 \end{bmatrix}$$

is not necessarily of full rank, where 0 is a zero vector and $$R_t^{upper} = \begin{bmatrix} * & * & \cdots & * \\ 0 & * & \cdots & * \\ \vdots & \ddots & \ddots & \vdots \\ 0 & \cdots & 0 & * \end{bmatrix} \quad (8)$$

is an upper triangular matrix, and * in $R_t^{upper}$ is a nonzero element. From Eq. (6), the inverse of $\Sigma_t$ can be computed as $$\Sigma_t^{-1} = N(XX^T) = N\{(R_t^{upper})^{-1}[(R_t^{upper})^T]^{-1}\} \quad (9)$$

where the unitary matrix $Q_t$ is canceled out in Eq. (6) because $Q_t^{-1} = Q_t^T$. Substituting $\Sigma_t^{-1}$ in Eq. (9) for $R_{L \times L}^{-1}$ in (5) yields $$w^* = \{(R_t^{upper})^{-1}[(R_t^{upper})^T]^{-1}\} \cdot d(d^T\{(R_t^{upper})^{-1} [(R_t^{upper})^T]^{-1}\}d)^{-1}. \quad (10)$$

Since $R_t^{upper}$ is an upper triangular matrix, so is $(R_t^{upper})^{-1}$. Therefore, Eq. (10) does not require computation of $R_{L \times L}^{-1}$. As a result, it can be implemented in real time processing. In an exemplary embodiment, Givens Rotation is used to perform QR-decomposition.

In a first embodiment of the invention for CEM implementation, Eq. (5) is decomposed into several components, each component implemented by a separated hardware module, whereby $$w^* = \frac{R_{L \times L}^{-1} d}{d^T R_{L \times L}^{-1} d} = \frac{(XX^T)^{-1} d}{d^T (XX^T)^{-1} d} = \frac{(R_t^{upper})^{-1}[(R_t^{upper})^T]^{-1} d}{d^T (R_t^{upper})^{-1}[(R_t^{upper})^T]^{-1} d}. \quad (11)$$

To implement Eq. (11), five modules are required:

Module 1: Array of CORDIC circuits (101, 102, 103) shown in FIG. 1 where the pixel stream is fed into the module and the upper triangular matrix $R_t^{upper}$ is updated in real-time.

Module 2: Apply backsubstitution to obtain the inverse of $R_t^{upper}$ invR.

Module 3: Apply distributed arithmetic to calculate $c = [(R_t^{upper})^T]^{-1} d = \text{invR}^T * d$.

Module 4: Compute $w = \text{invR}^T * c$.

Module 5: The filter output energy can be obtained by applying a FIR filter to the current input pixel streams.

The detailed implementation for each of five modules is described as follows.

In Module 1, a set of CORDIC circuits (101, 102, 103) are applied to perform Givens rotation, as shown in FIG. 1. Values of r in FIG. 1 are input pixel values, and values of r̃ are processed pixel values. For demonstrative purpose, assume L=3. First, two pixel streams (row 1 and row 2) are fed into the CORDIC circuit (101). As a result, the first zero, which will occupy the $r_{21}$ position, is introduced by a Givens Rotation. The first pair ($r_{11}$, $r_{12}$) is the leading pair, it decides the angle needed to be rotated, and the other pairs are followers which will be rotated by the same angle accordingly. Then, the second zero, which will occupy the $r_{31}$ position, is introduced by the second CORDIC circuit (102) that operates on the row 1 and row 2. The third zero, which will occupy the $r_{32}$ position, is introduced by a CORDIC circuit (103) which operates on row 2 and 3. Finally, the output becomes an upper triangular matrix.

In Module 2, backsubstitution is applied to obtain the inverse of an upper triangular matrix $R_t^{upper}$, $(R_t^{upper})^{-1}$. For an illustrative purpose, assume that upper triangular matrix is $$R_t^{upper} = \begin{bmatrix} \tilde{r}_{11} & \tilde{r}_{12} & \tilde{r}_{13} \\ 0 & \tilde{r}_{22} & \tilde{r}_{23} \\ 0 & 0 & \tilde{r}_{33} \end{bmatrix}.$$

Figure 2:
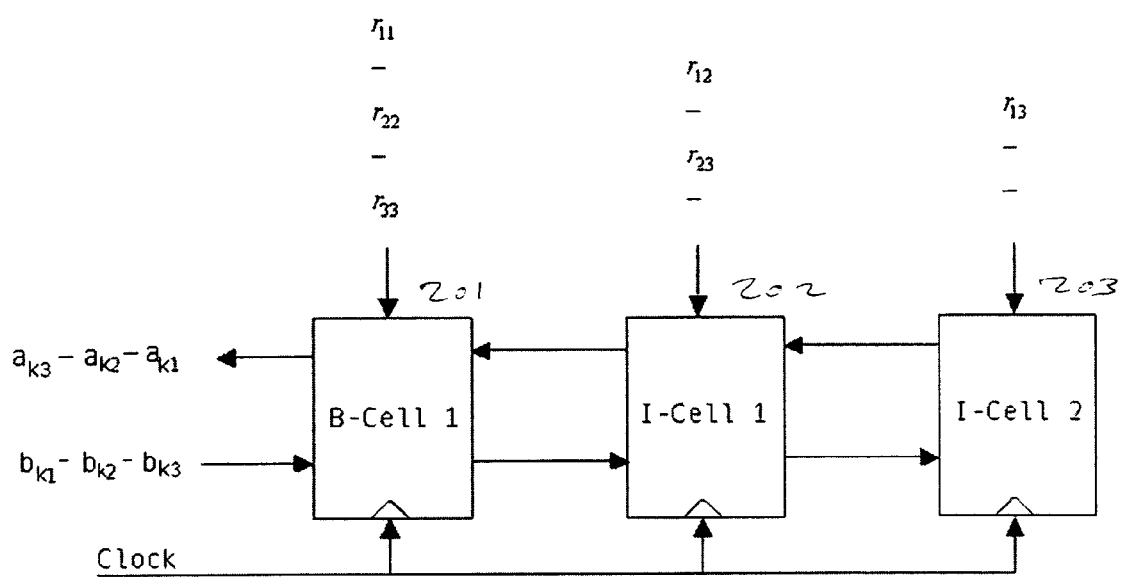
FIG. 2 illustrates a systolic array for backsubstitution consistent with an embodiment of the present invention.
Figure 3A:
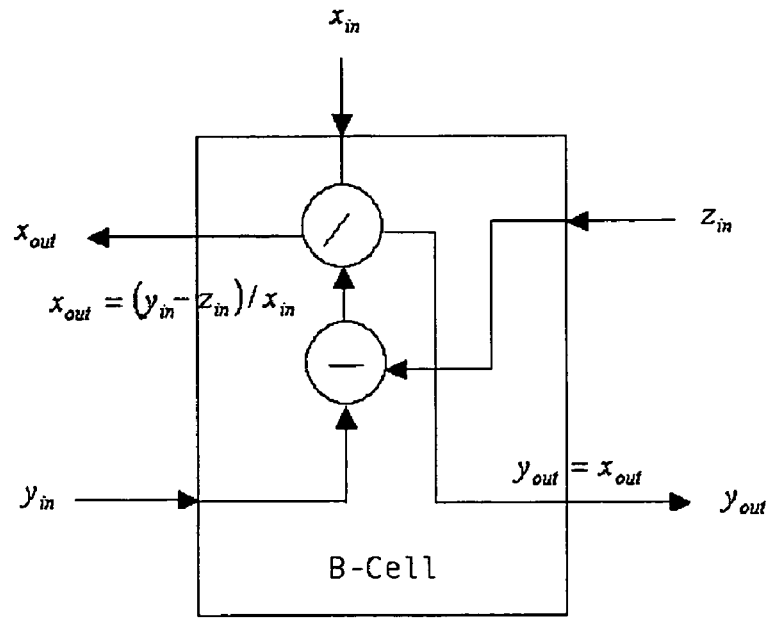
FIG. 3(a) illustrates a boundary cell of systolic array consistent with an embodiment of the present invention.
Figure 3B:
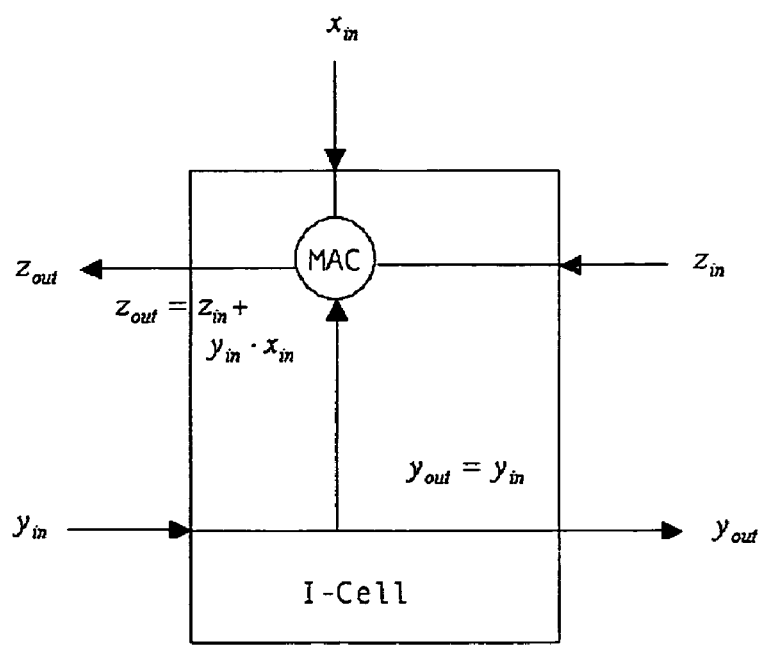
FIG. 3(b) illustrates an internal cell systolic array consistent with an embodiment of the present invention.

Its inverse is also an upper triangular matrix. If we let $$(R_t^{upper})^{-1} = \begin{bmatrix} a_{11} & a_{12} & a_{13} \\ 0 & a_{22} & a_{23} \\ 0 & 0 & a_{33} \end{bmatrix} = [a_1 \ a_2 \ a_3], \quad (12)$$

then $$R_t^{upper}[a_1 \ a_2 \ a_3] = I = \begin{bmatrix} 1 & 0 & 0 \\ 0 & 1 & 0 \\ 0 & 0 & 1 \end{bmatrix} = [b_1 \ b_2 \ b_3], \text{ and} \quad (13)$$

it can be calculated via $$R_t^{upper} a_k = b_k \quad (14)$$

where the upper triangular matrix $R_t^{upper}$ and the vector $b_k$ are known and the vector $a_k$ needs to be computed. Using Eq. (14), the backsubstitution can be described by the following recursive equation $$a_{kj} = \frac{\left(b_{kj} - \sum_{j=i+1}^{n} r_{ij} a_{kj}\right)}{r_{ii}} \quad (15)$$

with internal cells performing the summation given by $$\Sigma_{j=i+1}^{n} r_{ij} a_{kj} \quad (16)$$

and boundary cells completing the calculation. The architecture of the backsubstitution array is shown in FIG. 2, with boundary cell B-Cell 1 (201) and internal cells I-Cell 1 (202) and I-Cell 2 (203). The implementation of a boundary cell (300) is shown in FIG. 3(a) and the implementation of an internal cell (310) is shown in FIG. 3(b).

In Module 3, letting $c=(c_1, \ldots, c_L)^T$ and $$invR^T = \begin{bmatrix} v_{11} & 0 & 0 & \cdots & 0 \\ v_{12} & v_{22} & 0 & \cdots & 0 \\ v_{13} & v_{23} & v_{33} & \cdots & 0 \\ \vdots & \vdots & \vdots & \ddots & \vdots \\ v_{1L} & v_{2L} & v_{3L} & \cdots & v_{LL} \end{bmatrix},$$

then $c=invR^T*d$ can be represented as the inner product of two vectors as follows:

$$c_i = \Sigma_{k=1}^{L} v_{ki} d_k. \quad (17)$$

Because the desired signature $d_k$ is known a priori, the term $v_{ki} d_k$ is simply a multiplication with a constant. In this case, a distributed arithmetic (DA) architecture widely used in FPGA technology can be used to implement this module.

Assume that a B-bit system is used. The variable $v_{ki}$ can be represented by:

$$v_{ki} = \sum_{b=0}^{B-1} v(b)*2^b \text{ with } v(b) \in [0, 1] \quad (18)$$

where $v(b)$ denotes the $b^{th}$ bit of $v_{ki}$. Therefore, the inner product in (17) can be represented as $$c_i = \Sigma_{k=1}^{L} d_k * \Sigma_{b=0}^{B-1}(v(b)*2^b). \quad (19)$$

Re-distributing the order of summation results in $$c_i = \Sigma_{b=0}^{B-1} 2^b * \Sigma_{k=1}^{L}(d_k * v_b(k)) = \Sigma_{b=0}^{B-1} 2^b * \Sigma_{k=1}^{L} f(d_k, v_b(k)). \quad (20)$$

Figure 4:
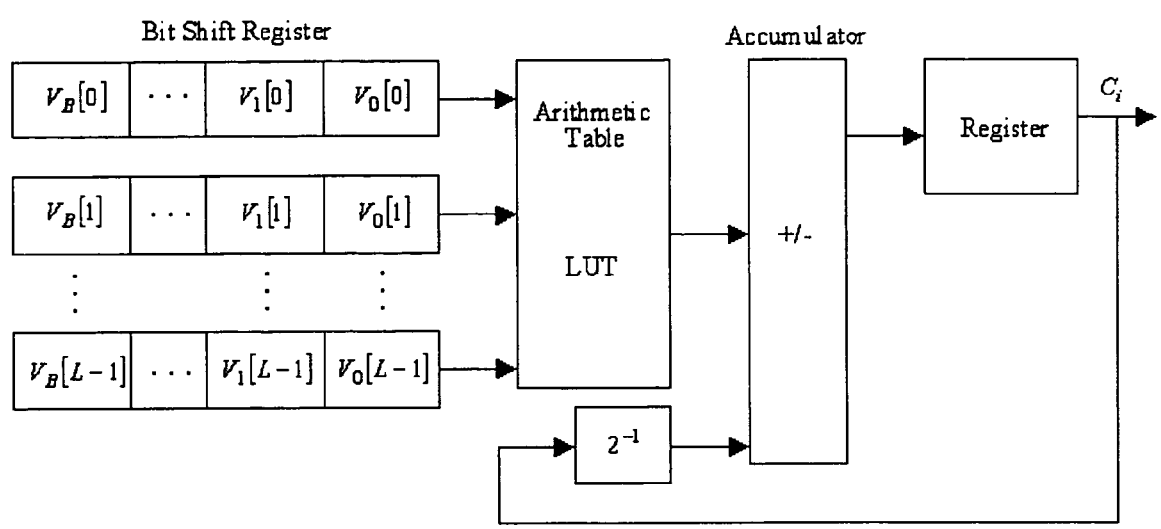
FIG. 4 illustrates a shift-adder DA Architecture consistent with an embodiment of the present invention.

Implementation of the function $f(d_k, v_b(k))$ in Eq. (20) can be realized by a LUT. That is, a LUT is preprogrammed to accept an L-bit input vector $v_b=(v_b(0), \ldots, v_b(1), v_b(L-1))^T$, and output $f(d_k, v_b(k))$. The i weighted by an appropriate power-of-two factor and accumulated. The accumulation can be efficiently implemented using a shift-adder (400) as shown in FIG. 4. After L look-up cycles, the inner product $c_i$ is computed at output (410).

In Module 4, a weight vector is generated. The inverse of $R_t^{upper}$, invR is an upper triangular matrix, and can be represented as $$invR_t^{upper} = \begin{bmatrix} v_{11} & v_{12} & \cdots & v_{1L} \\ v_{21} & v_{22} & \cdots & v_{2L} \\ \vdots & \vdots & \ddots & \vdots \\ v_{L1} & v_{L2} & \cdots & v_{LL} \end{bmatrix} \quad (21)$$

where $v_{ij}=0$ if $i>j$. The purpose of this module is to compute $w=invR_t^{upper}*c$.

Figure 5:
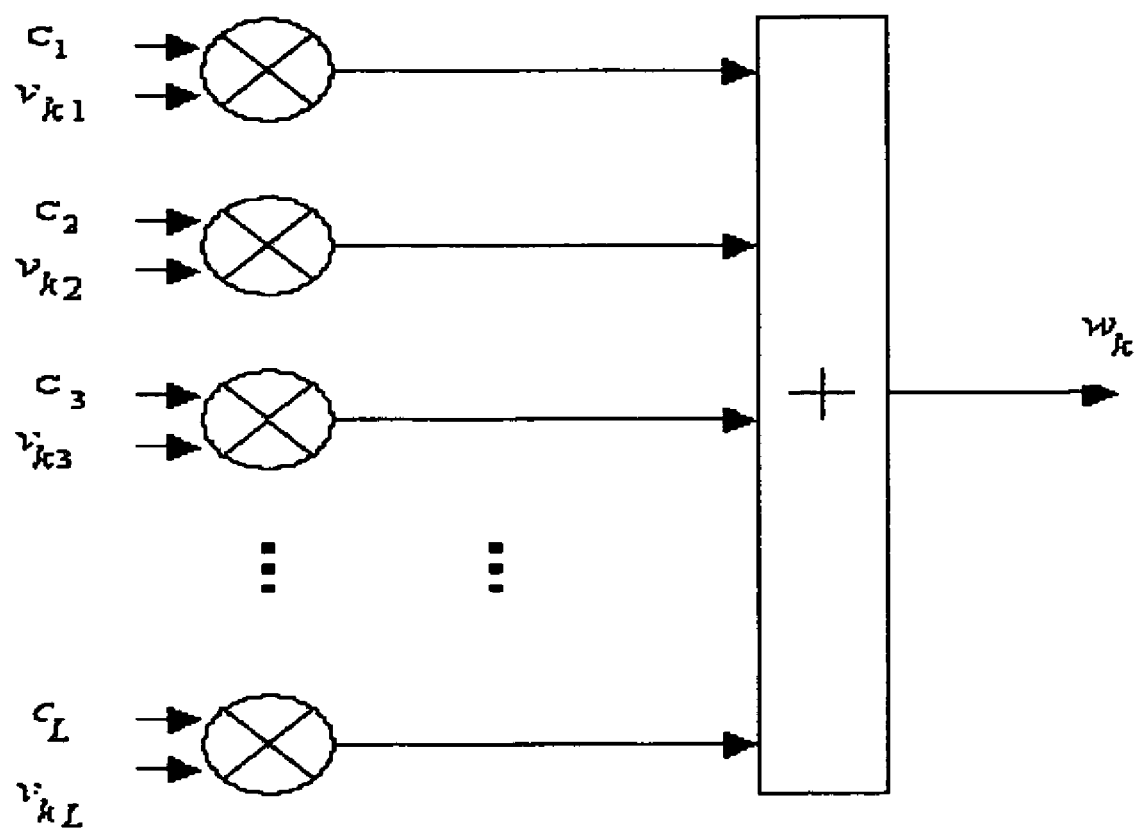
FIG. 5 illustrates a computation of $w_k$ consistent with an embodiment of the present invention.

Suppose $w=(w_1, w_2, \ldots, w_L)^T$ and $c=(c_1, c_2, \ldots, c_L)^T$. The kth element of w can be obtained by $$w_k = \sum_{m=1}^{L} c_m v_{km} \quad (22)$$

with its computation circuit (500) shown in FIG. 5.

Figure 6:
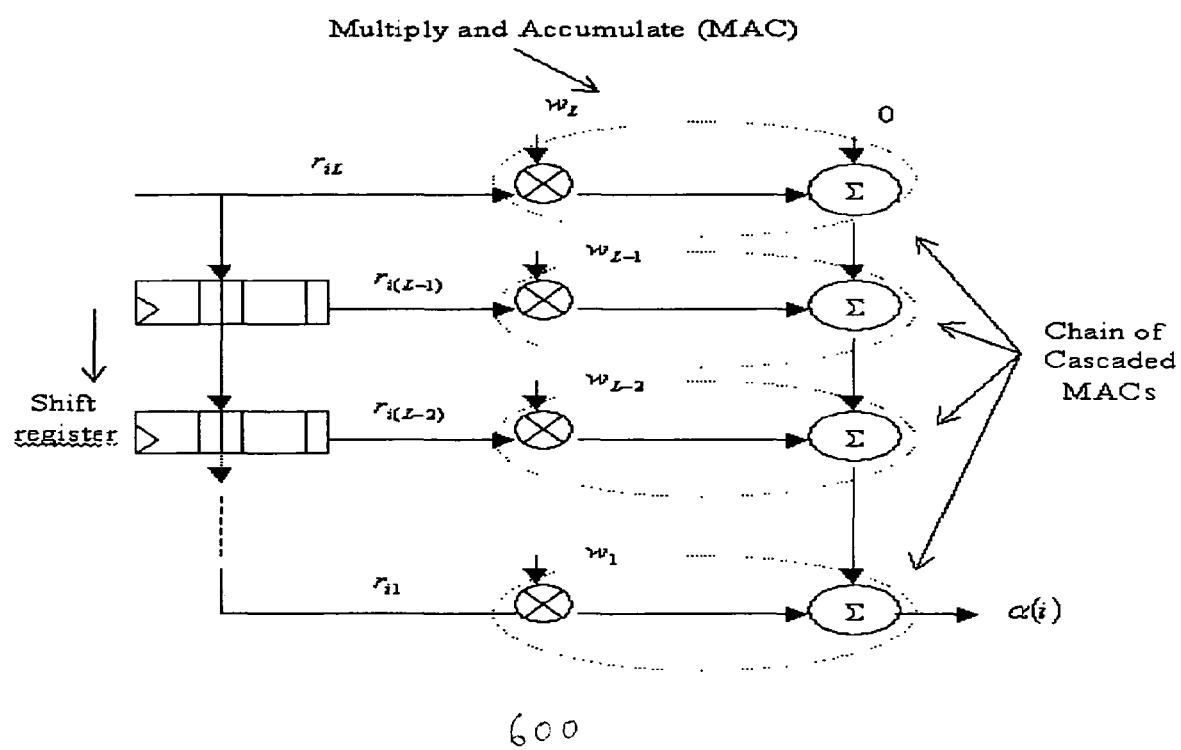
FIG. 6 illustrates a FIR filter for abundance estimation consistent with an embodiment of the present invention.

In Module 5, operation is shown in FIG. 6, delineating a FIR filter (600) to produce estimated abundance fractions, determining filter output energy.

In a second embodiment of the invention for CEM implementation, the correlation matrix is calculated before QR-decomposition shown in FIG. 6. Since $d^T R_{L\times L}^{-1}$ in Eq. (5) is a constant, $R_{L\times L}^{-1} d$ represents relative strength of detection power. Letting $w=R_{L\times L}^{-1} d$, i.e. $R_{L\times L} w=d$, where $R_{L\times L}^{-1} d$ can be implemented by a CORDIC module and followed by a backsubstitution module. As a result, four modules are required to implement this modified CEM detector:

Module 1: Auto-correlator.

Module 2: Apply CORDIC circuits to triangularize [R|d].

Module 3: Apply backsubstitution to obtain w.

Module 4: The filter output energy $\delta_{CEM}(r)=w^T r$ can be obtained by applying a FIR filter to the current input pixel streams.

In Module 1, an auto-correlator generates the correlation matrix $R_{L\times L}(i)$ with $R_{L\times L}(i)=R_{L\times L}(i-1)+r_i r_i^T$ and a pixel-by-pixel update process. In other words, the correlation matrix is updated every time a new pixel arrives. For illustrative purpose, let us assume L=3, then the new correlation matrix can be obtained by $$\begin{bmatrix} R_{11} & R_{12} & R_{13} \\ R_{21} & R_{22} & R_{23} \\ R_{31} & R_{32} & R_{33} \end{bmatrix} \quad (23)$$

$$(i) = \begin{bmatrix} R_{11} & R_{12} & R_{13} \\ R_{21} & R_{22} & R_{23} \\ R_{31} & R_{32} & R_{33} \end{bmatrix}(i-1) + \begin{bmatrix} r_{i1} \\ r_{i2} \\ r_{i3} \end{bmatrix}[r_{i1} \ r_{i2} \ r_{i3}].$$

Figure 7:
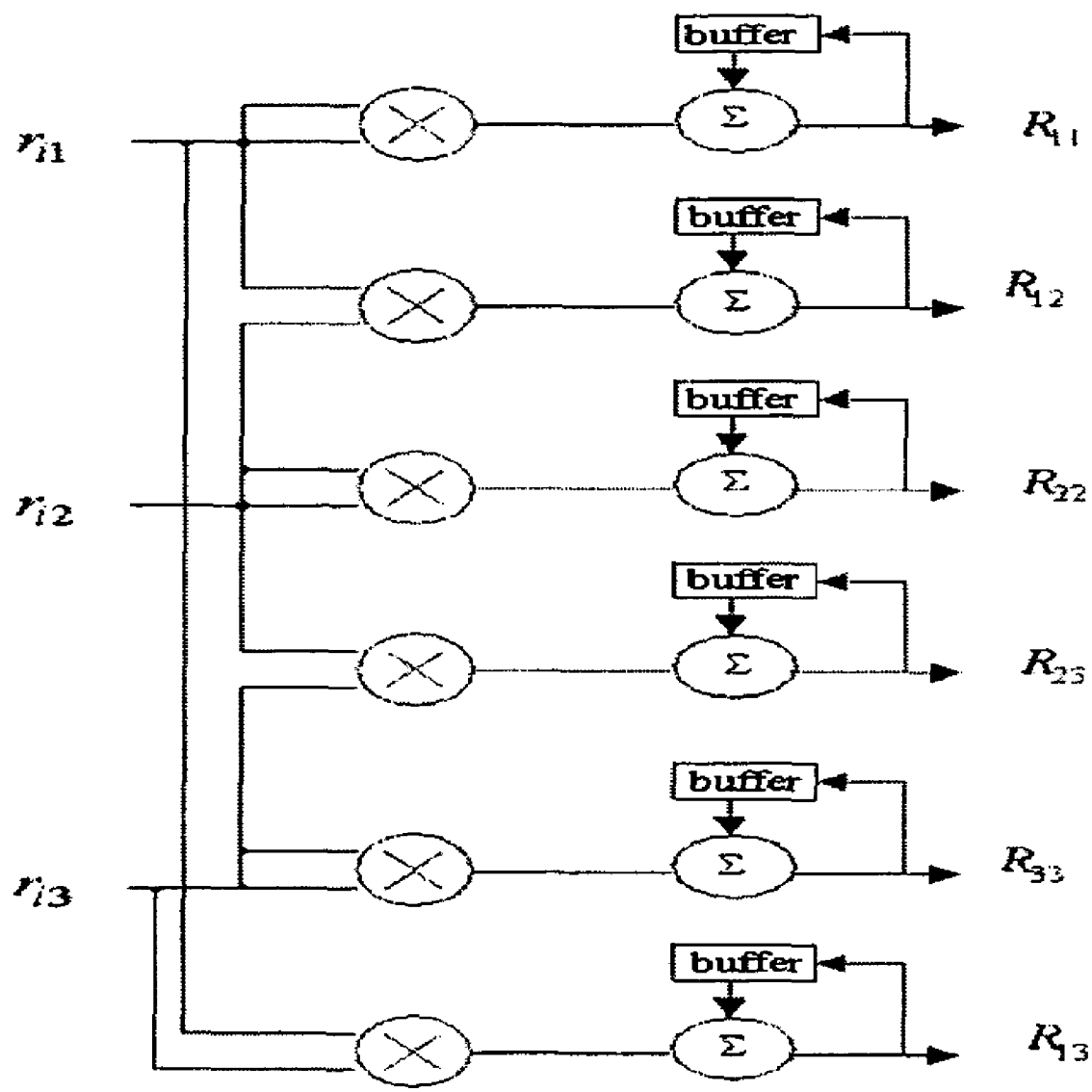
FIG. 7 illustrates a block diagram of the auto-correlator consistent with another embodiment of the present invention.

The implementation of Eq. (23) is shown in auto-correlator (700) of FIG. 7.

Figure 8:
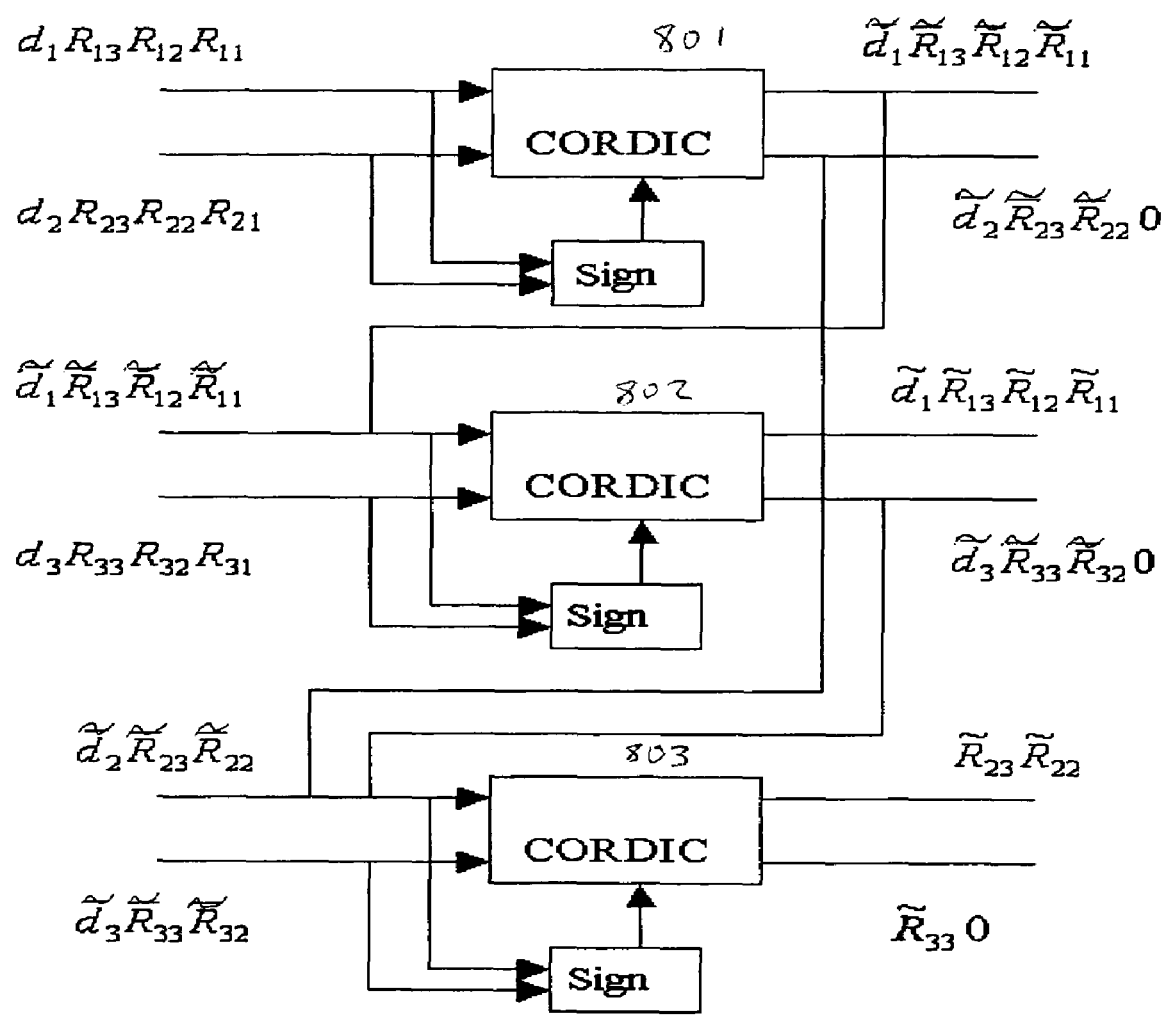
FIG. 8 illustrates a QR-decomposition by CORDIC circuit consistent with another embodiment of the present invention.

In Module 2, QR-decomposition of the correlation matrix by CORDIC circuit is accomplished. The purpose of this module is to triangularize the matrix [R|d], i.e. to convert the matrix $$\begin{bmatrix} R_{11} & R_{12} & R_{13} & | & d_1 \\ R_{21} & R_{22} & R_{23} & | & d_2 \\ R_{31} & R_{32} & R_{33} & | & d_3 \end{bmatrix}$$

to an upper triangular matrix $$\begin{bmatrix} \tilde{R}_{11} & \tilde{R}_{12} & \tilde{R}_{13} & | & \tilde{d}_1 \\ 0 & \tilde{R}_{22} & \tilde{R}_{23} & | & \tilde{d}_2 \\ 0 & 0 & \tilde{R}_{33} & | & \tilde{d}_3 \end{bmatrix}$$

by Givens Rotation. Similar to the first embodiment, the module is implemented by a set of CORDIC circuits, the difference being that the pixel stream is fed directly to the circuit for the first embodiment, while in this second embodiment, both the elements in the correlation matrix and the signatures of the desired target are fed, for example, the first data stream feeding into the CORDIC circuit (801) is $R_{11}$ first, followed by $R_{12}$, and then $R_{13}$, the last one is $d_1$, as depicted in FIG. 8. Values of R in FIG. 8 are input pixel values, and values of $\tilde{R}$ are processed pixel values.

As soon as the first CORDIC (801) in the chain has been fed by all the data it needs for row one, it is free to accept and process data for the new row. The second CORDIC (802) can begin its work on row 2 of the triangular matrix as soon as the first CORDIC (801) has finished its work on the second element pair. The third CORDIC (803) can begin its work as soon as the second CORDIC (802) has finished its work, and so on.

In Module 3, backsubstitution is applied to obtain the CEM filter coefficients w with $w = R_{L \times L}^{-1} d = \tilde{R}_{L \times L}^{-1} \tilde{d}$ where $\tilde{R}_{L \times L}$ is an upper triangular matrix. For an illustrative purpose, assume that $$\tilde{R}_{L \times L} = \begin{bmatrix} \tilde{r}_{11} & \tilde{r}_{12} & \tilde{r}_{13} \\ 0 & \tilde{r}_{22} & \tilde{r}_{23} \\ 0 & 0 & \tilde{r}_{33} \end{bmatrix}.$$

Figure 9:
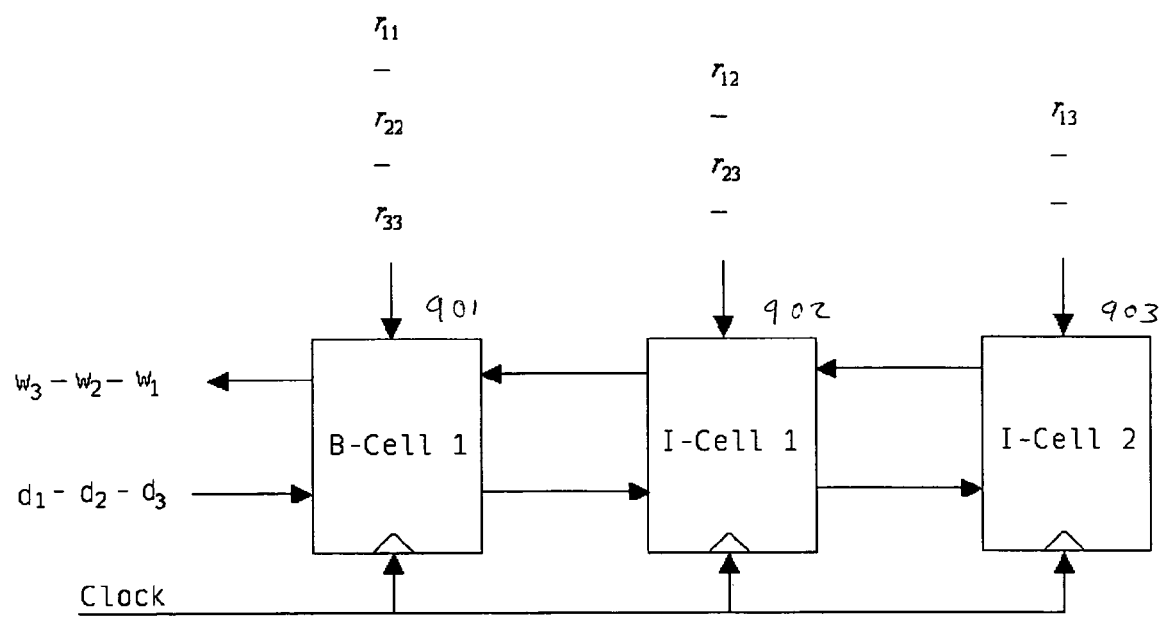
FIG. 9 illustrates a systolic array for backsubstitution consistent with another embodiment of the present invention.
Figure 10A:
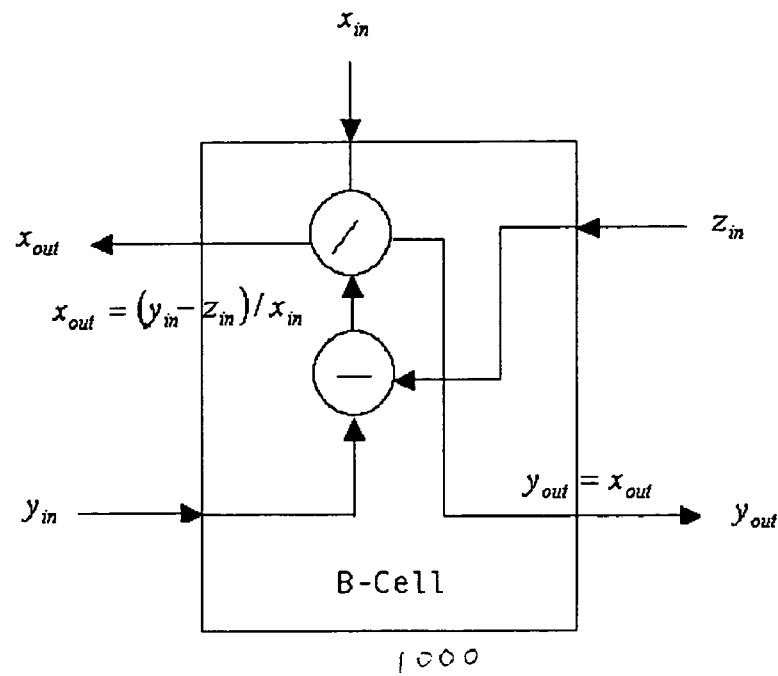
FIG. 10a illustrates a boundary cell implementation for systolic array consistent with another embodiment of the present invention.
Figure 10B:
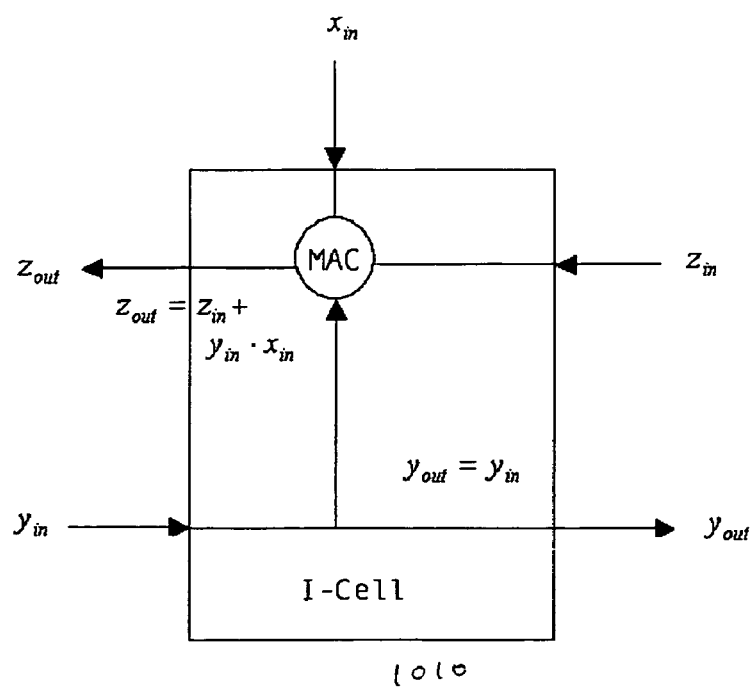
FIG. 10b illustrates an internal cell implementation for systolic array consistent with another embodiment of the present invention.

Letting the weight be $w = (w_1, w_2, w_3)^T$, it can be calculated via $$\tilde{R}_{L \times L} w = \tilde{d} \quad (24)$$

where the upper triangular matrix $\tilde{R}_{L \times L}$ and the vector $\tilde{d}$ are known and the vector w needs to be computed. Using Eq. (24), the backsubstitution can be described by the following recursive equation:

$$w_i = \frac{\left( \tilde{d}_i - \sum_{j=i+1}^{l} \tilde{r}_{ij} \cdot w_j \right)}{\tilde{r}_{ii}} \quad (25)$$

with internal cells performing the summation given by $$\Sigma_{j=i+1}^{n} r_{ij} a_{kj} \quad (26)$$

and boundary cells completing the calculation. The architecture of the backsubstitution array is shown in FIG. 9, with boundary cell B-Cell 1 (901) and internal cells I-Cell 1 (902) and I-Cell 2 (903). The implementation of a boundary cell (1000) is depicted in FIG. 10(*a*) and the implementation of an internal cell (1010) is depicted in FIG. 10(*b*).

In Module 4, analogous to the first embodiment, the FIR filter (600) may also operate to produce estimated abundance fractions, determining filter output energy.

Figure 11:
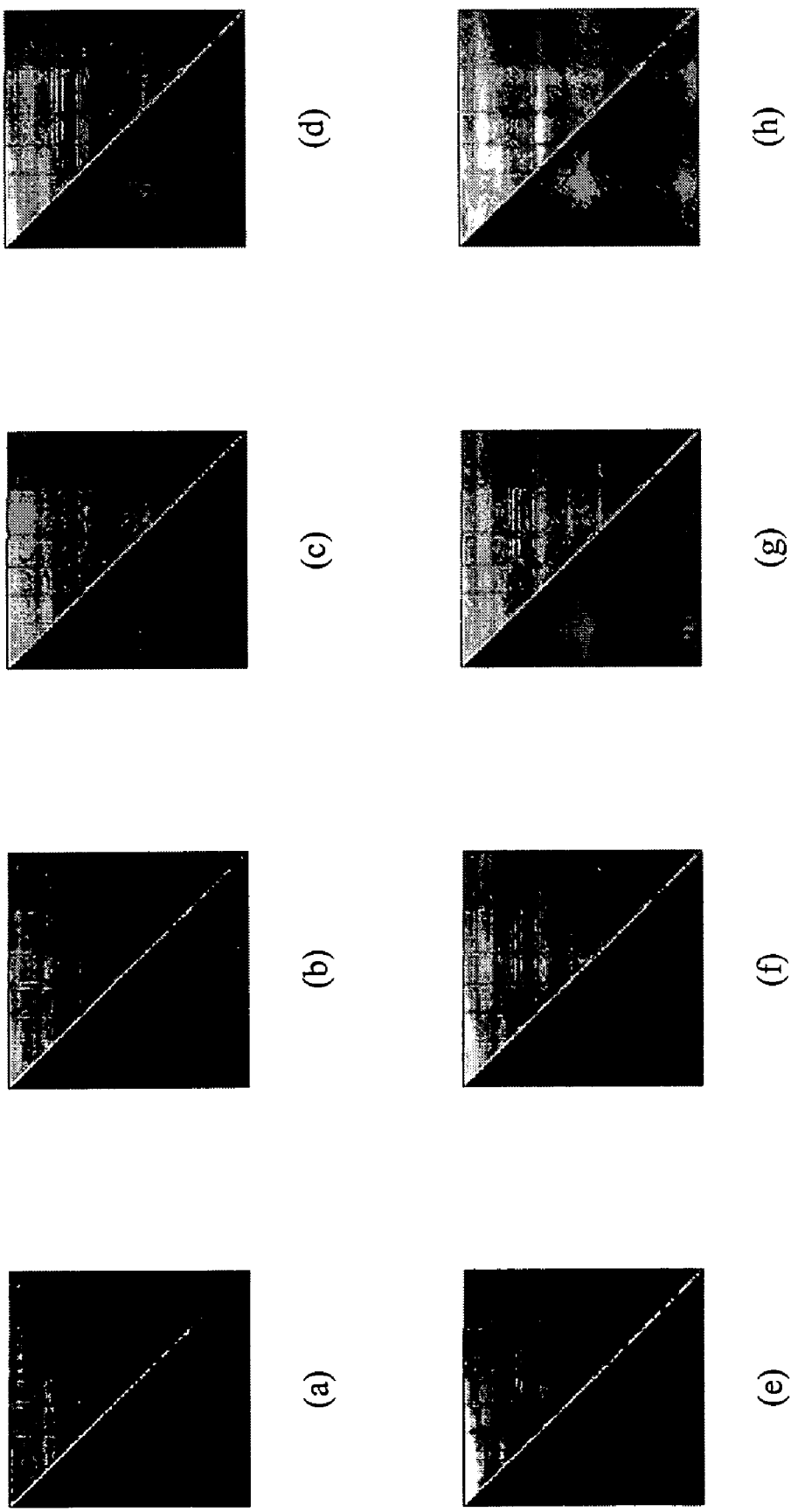
FIGS. 11(a)-(h) illustrate real-time updated triangular matrixes for varying lines of pixel streams via CORDIC circuit.

Simulation results using architecture of the first embodiment will now be presented. Here, Givens rotation is used to simulate the inventive design. The code is written in C and use the floating-point operation. As shown in FIG. 11, the output of CORDIC circuit is updated in real-time, i.e., the upper triangular matrix receives more information as a new line is fed to the circuit.

Figure 12:
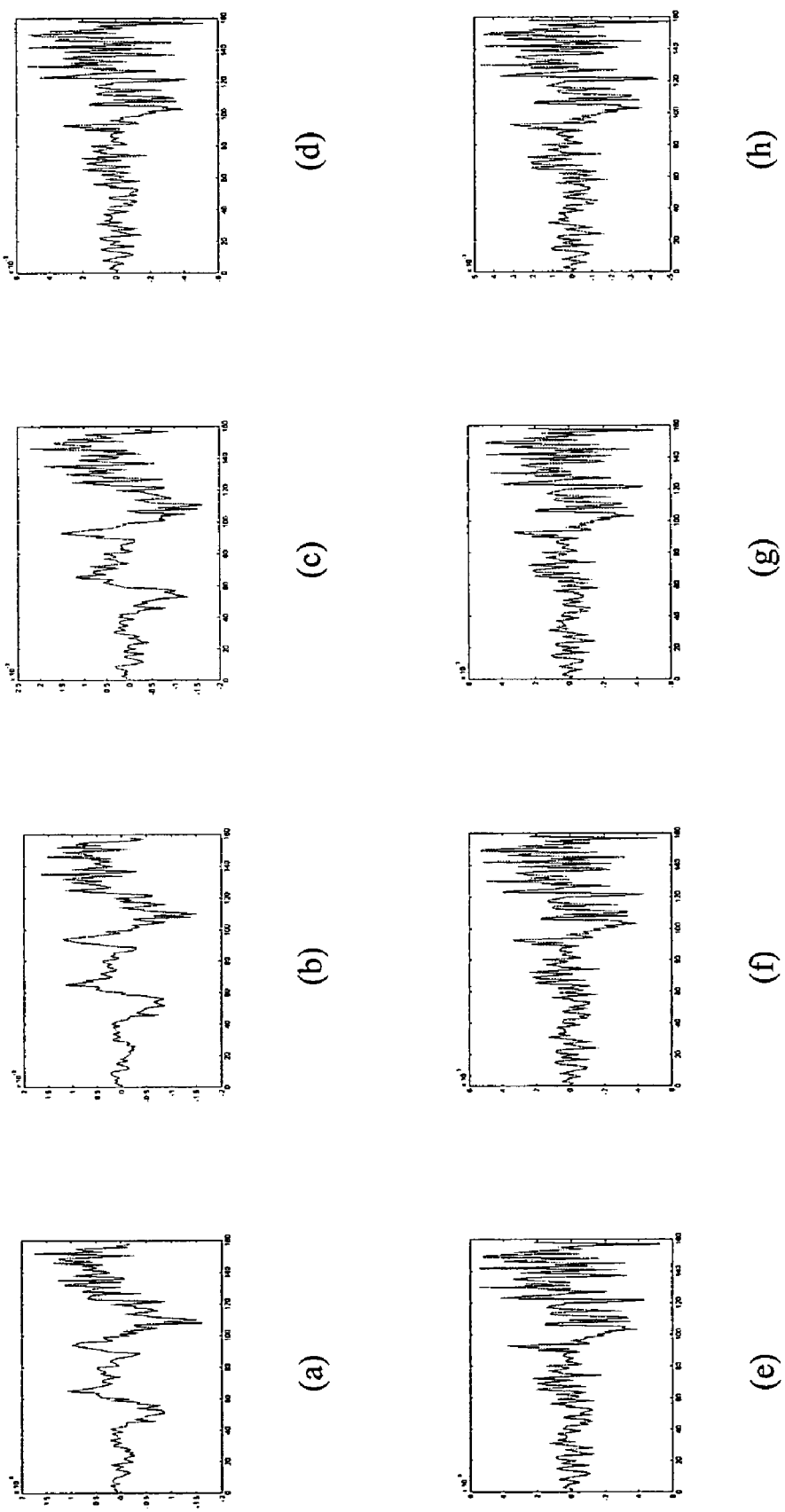
FIGS. 12(a)-(h) illustrate real-time updated weights for varying lines of pixel streams.
Figure 13:
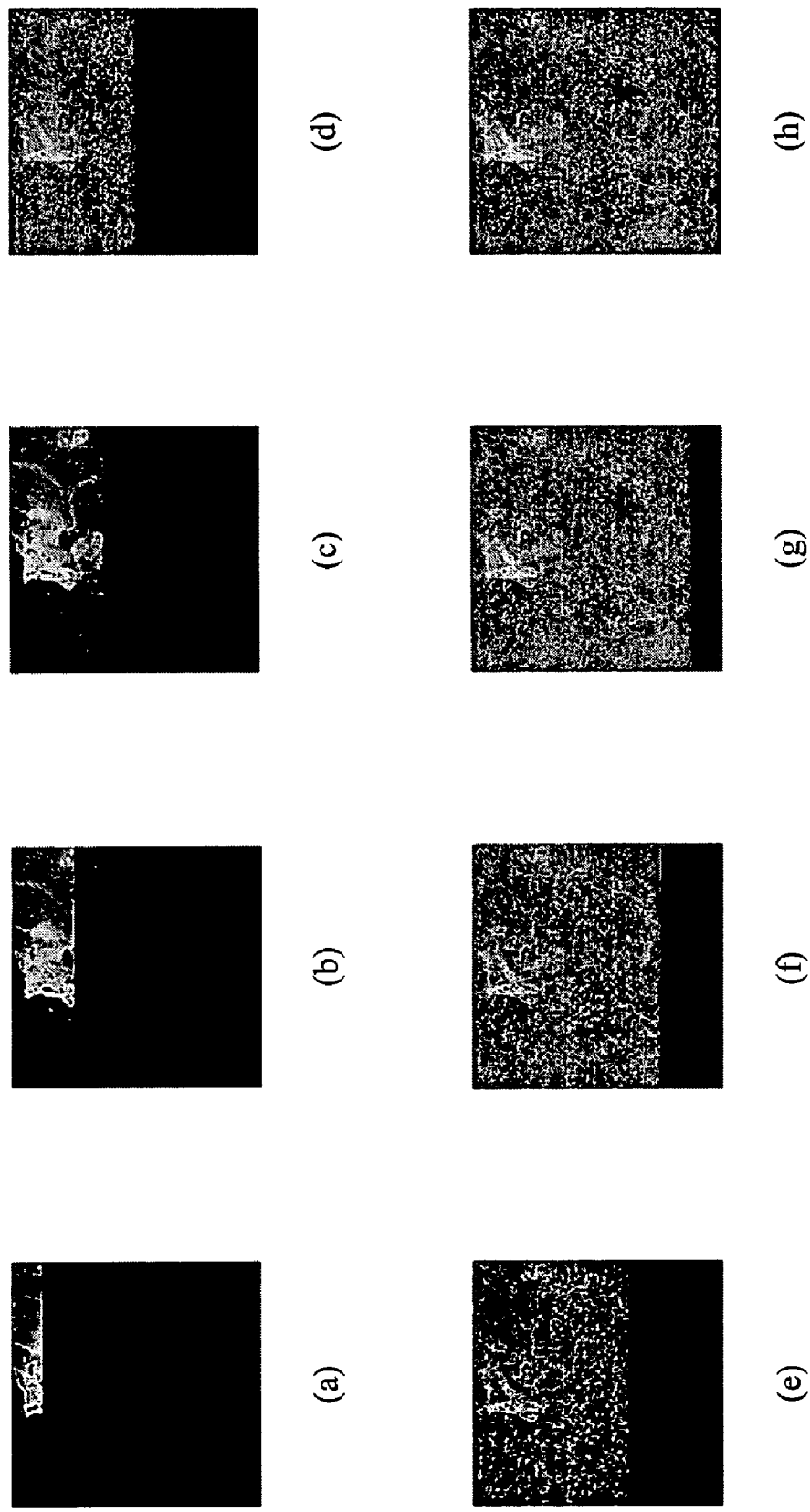
FIGS. 13(a)-(h) illustrate real-time detection result for varying lines of pixel streams.

FIG. 11(*a*)-(*h*) are the results after the first 25, 50, 75, 100, 175 and 200 lines of pixels streams are fed into the CORDIC circuits. In the mean time, the output of the weight-generated circuit also progressively updates its weight, as depicted in FIG. 12. Additionally, the estimates of the FIR filter coefficients become more accurate and approximately approach the desired FIR coefficients as more pixels are fed to the circuit. As demonstrated in FIG. 12(*a*)-(*h*), the weights generated after 100 lines are very close to the ones generated by using the complete set of pixels streams. FIG. 13 shows real-time detection results from the desired FIR filter, where FIG. 13(*a*)-(*h*) are the detection results of the first 25 lines, first 50 lines, and so on, until all 200 lines are completed.

Two embodiments have been discussed for computing the input stream in CEM. The first embodiment computes the input stream from image pixel vectors directly, while the second embodiment computes the sample correlation matrix R.

The first embodiment requires five modules. The first module is designed from an array of CORDIC circuits where the pixel stream is fed into the module and the upper triangular matrix $R_t^{upper}$ is updated in real-time. This is followed by the second module which applies backsubstitution to compute the inverse of $R_t^{upper}$, invR. Then Module 3 uses a distributed arithmetic to calculate $c = [(R_t^{upper})^T]^{-1} d = invR^T * d$ where the d is the desired target signature. Next, Module 4 is developed to obtain the desired filter vector w by finding $w = invR * c$. Finally, Module 5 produces the results by applying a FIR filter to the current input pixel streams.

Figure 14A:
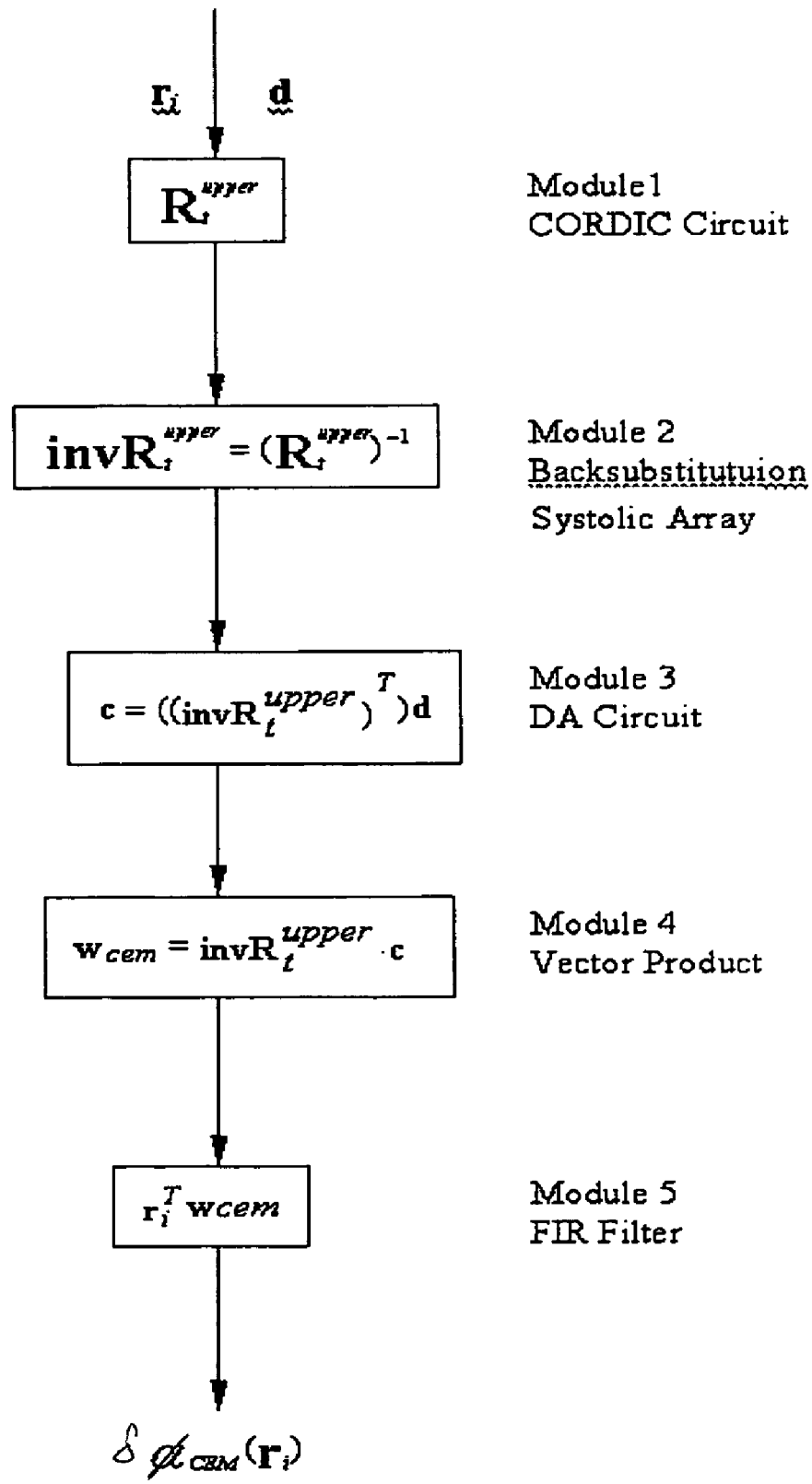
FIG. 14(a) illustrates a block diagram of a FPGA design of CEM consistent with an embodiment of the present invention.
Figure 14B:
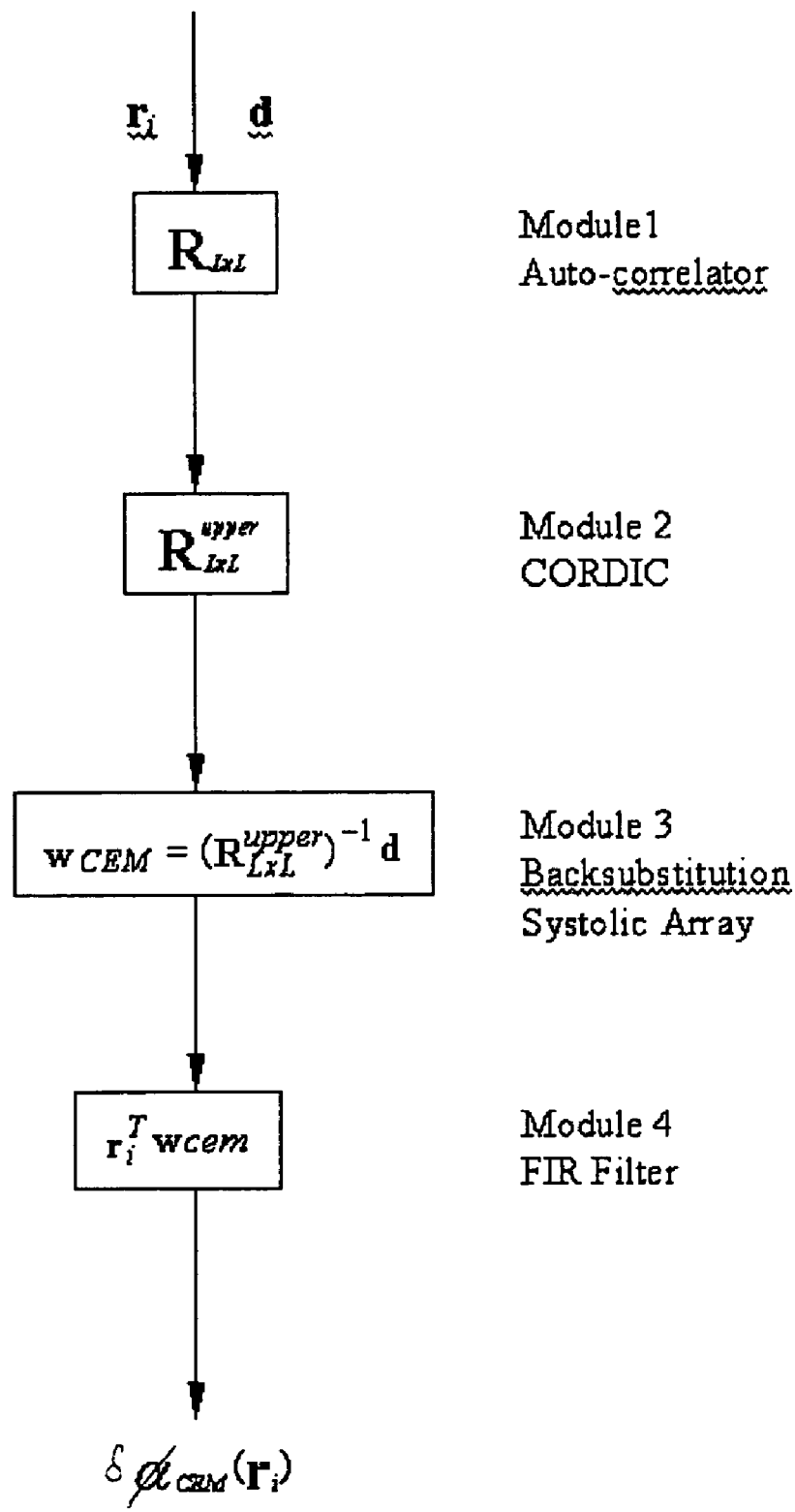
FIG. 14(b) illustrates a block diagram of a FPGA design of CEM consistent with another embodiment of the present invention.

The second embodiment takes an alternative approach by first computing the auto-correlation matrix R. Four modules are required for this embodiment. Module 1 is an autocorrelator that calculates the sample correlation matrix R. It is then followed by Module 2, which uses the CORDIC circuits to triangularize [R|d]. Next, Module 3 applies backsubstitution to obtain the desired filter vector w. Finally, Module 4 produces the filter output energy $\delta_{CEM}(r) = w^T r$ for target detection by applying a FIR filter to the current input pixel streams. FIG. 14(*a*) and FIG. 14(*b*) depict block diagrams of the first and second embodiments, respectively, to be used for FPGA design of the CEM.

Figure 15:
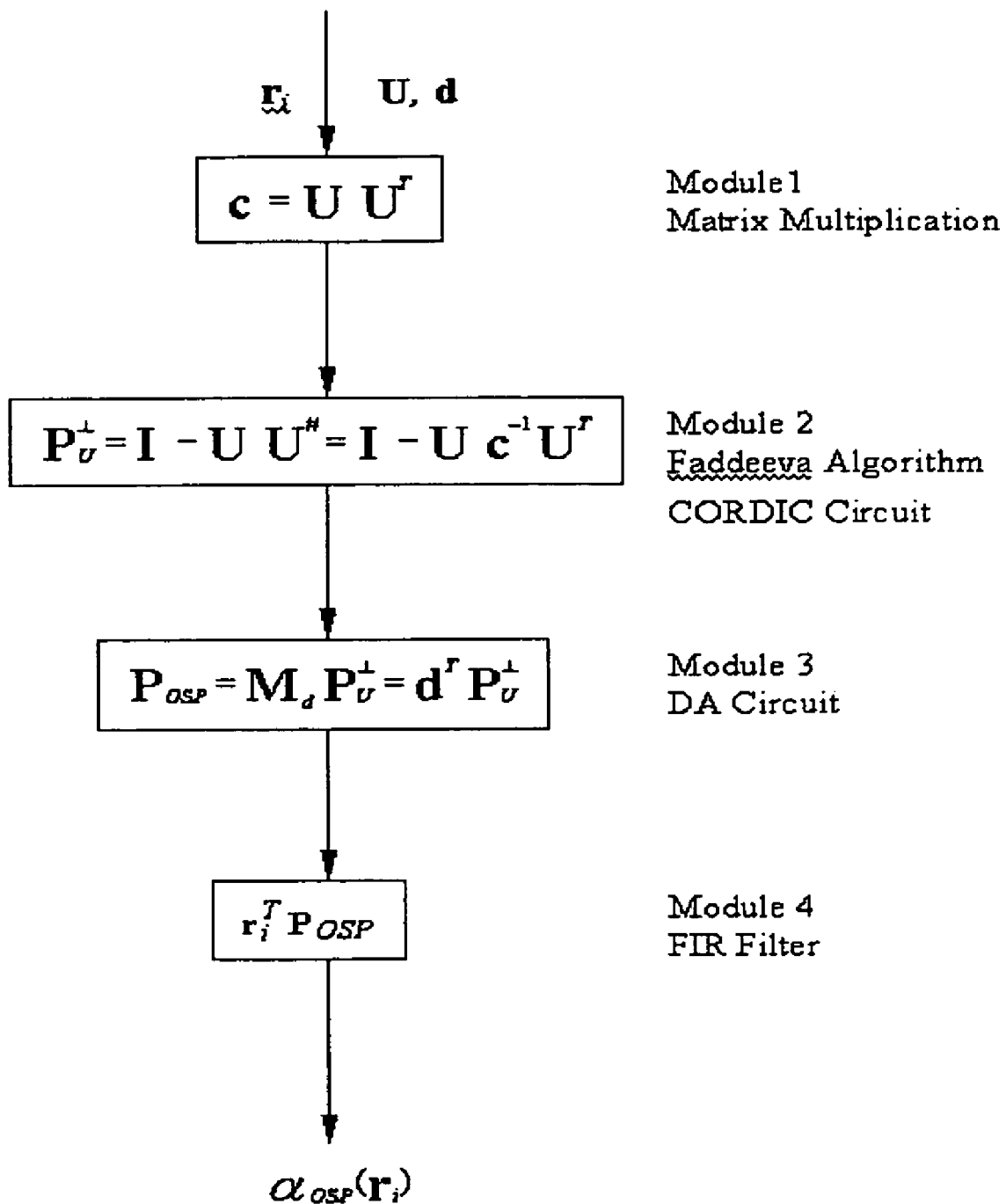
FIG. 15 illustrates a block diagram of a FPGA design of OSP consistent with a further embodiment of the present invention.

Focus has been placed on real-time implementation of the CEM. Numerous other embodiments utilizing CORDIC for subpixel detection and mixed pixel classification approaches are also possible. These approaches include, but are not limited to Orthogonal Subspace Projection (OSP), causal RX algorithm-based anomaly detector (CRXD), and an unsupervised Kalman Filter-based Linear Unmixing (UK-FLU). In OSP, computation of the pseudo-inverse of a matrix is required, similar to CEM's computation of the inverse of the sample correlation matrix. OSP also requires complete target knowledge for subpixel detection and multipixel classification. FIG. 15 depicts a block diagram of four modules used for FPGA design of OSP. In a first module, a systolic array is designed for a matrix multiplication circuit. A second module applies Faddeeva algorithm to calculate the undesired target signature rejector $P_U^\perp$, which may be implemented by CORDIC circuits. A third module obtains filter coefficients by a distributed arithmetic circuit. A fourth module generates the detection/classification results by a FIR filter.

Figure 16:
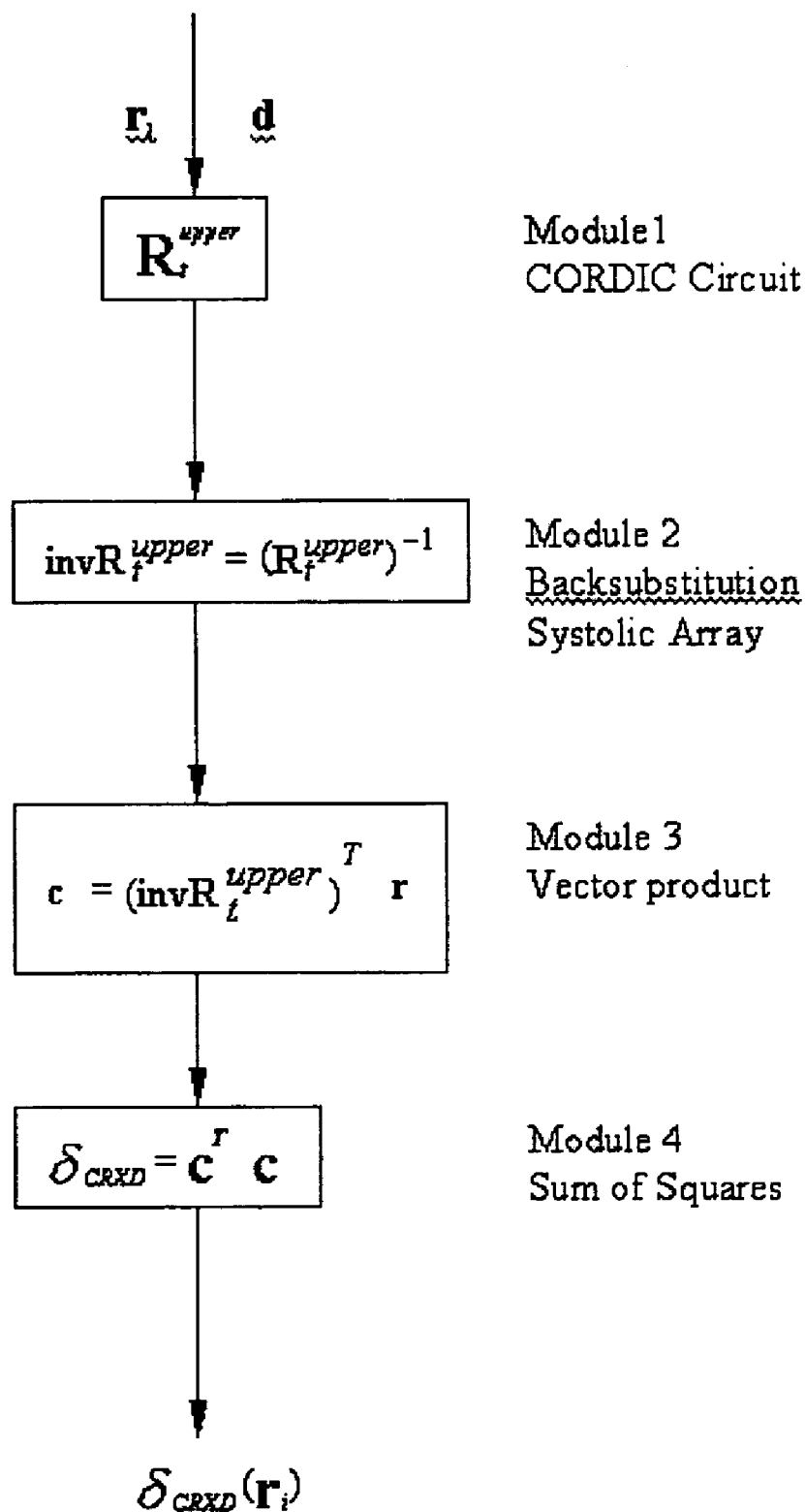
FIG. 16 illustrates a block diagram of a FPGA design of CRXD consistent with yet a further embodiment of the present invention.

In CRXD, a real-time processing RX detector is utilized for anomaly detection for multispectral and hyperspectral images. The CRXD process and updates data either line-by-line or sample-by sample, and may also implement anomaly detection in real-time. An FPGA design of CRXD comprising four modules is shown in FIG. 16. Module 1 is an array of CORDIC circuits which process the input pixel stream, outputting an upper triangular matrix. Module 2 is a systolic array computing the inverse of the upper triangular matrix by the backsubstitution algorithm. Module 3 is designed to generate a desired set of filter coefficients. Module 4 is a FIR filter formed by the filter coefficients obtained in Module 3, producing detection and classification results.

Figure 17A:
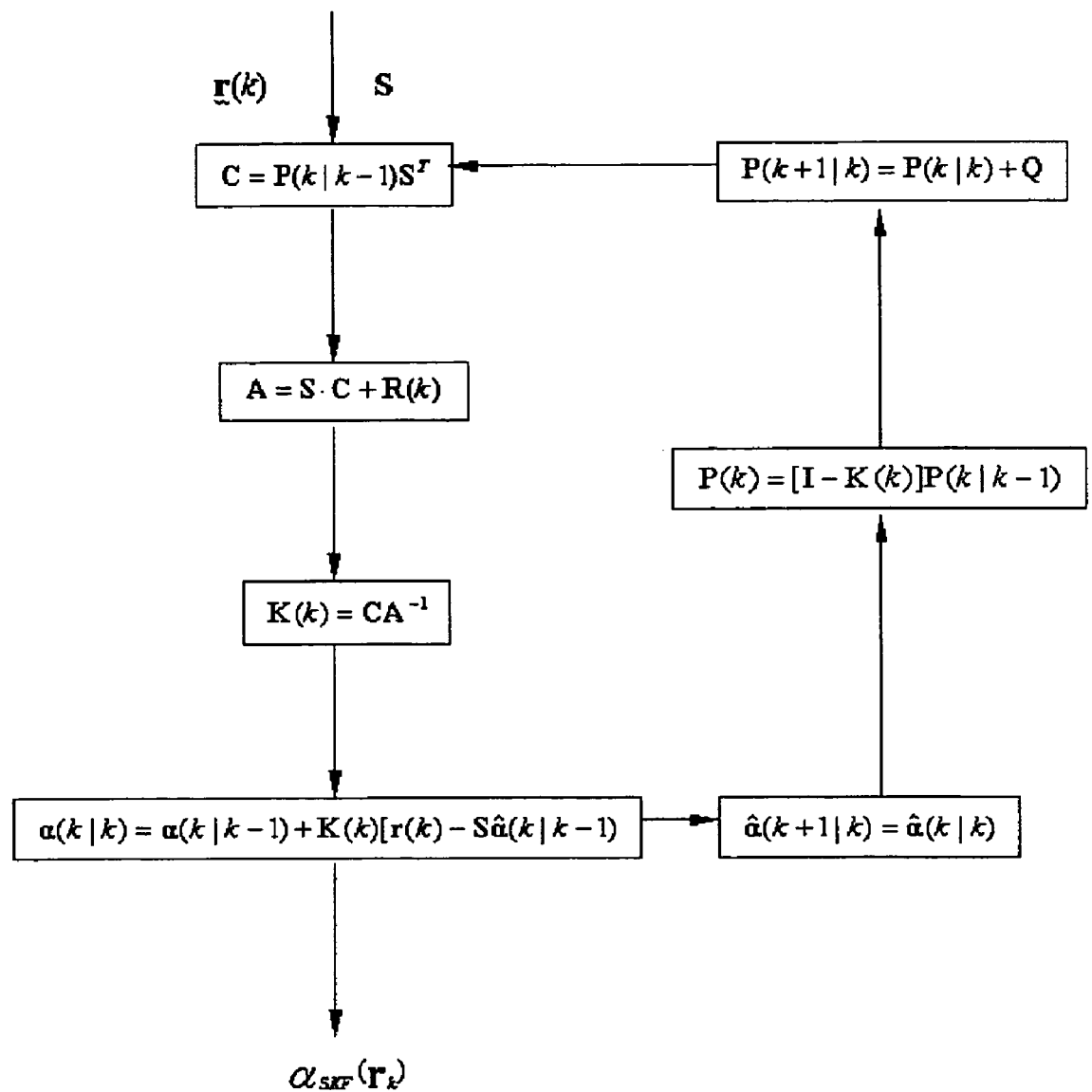
FIG. 17(a) illustrates a block diagram of a stationary UKFLU approach consistent with yet a further embodiment of the present invention.
Figure 17B:
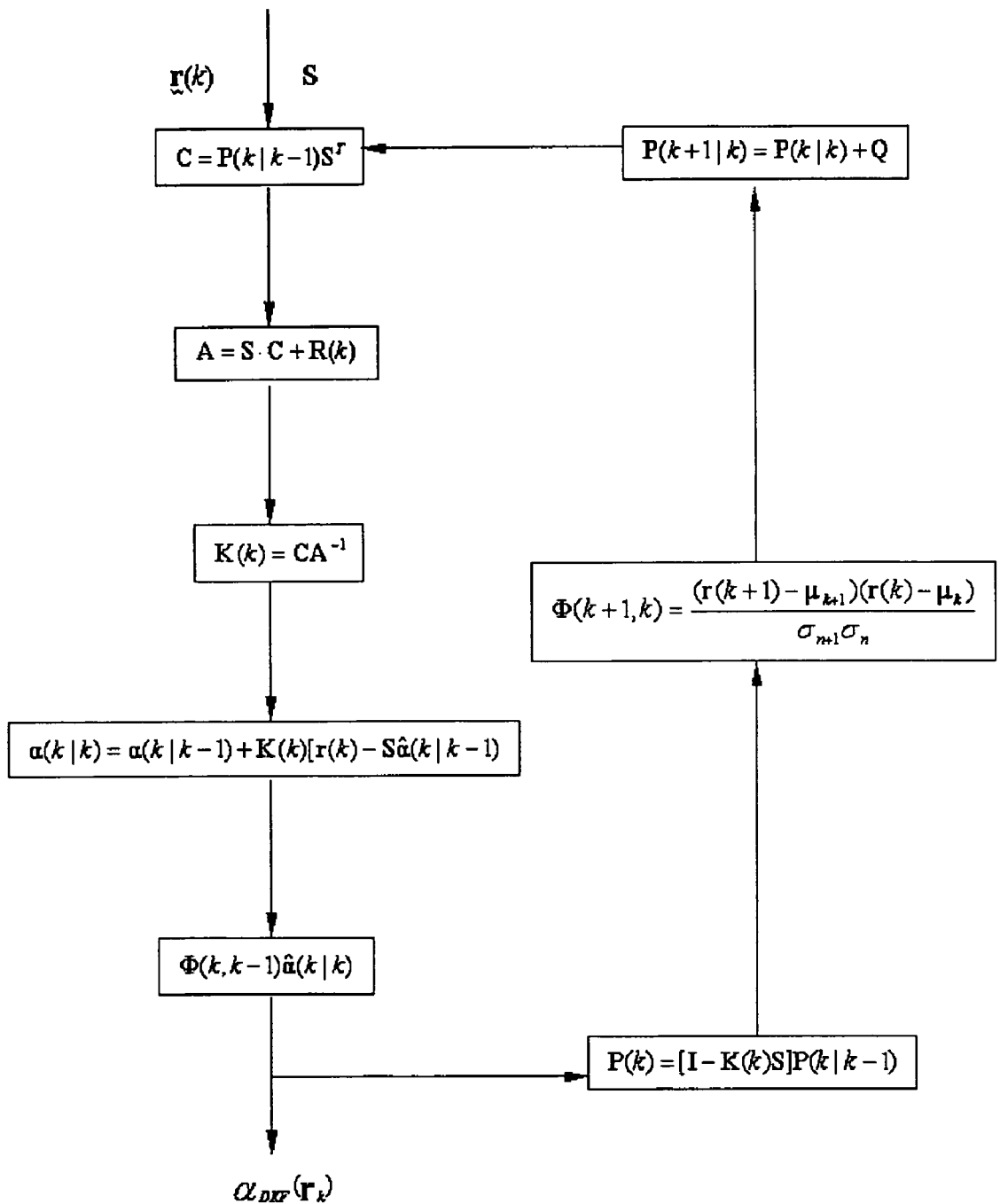
FIG. 17(b) illustrates a block diagram of a dynamic UKFLU approach consistent with yet a further embodiment of the present invention.

Alternatively, in another embodiment, UKFLU provides signature estimation for remotely sensed images. UKFLU takes into account inter-pixel spatial correlation. An embodiment of a stationary Kalman Filter for UKFLU is shown in FIG. 17(*a*), and an embodiment of a dynamic Kalman Filter for UKFLU is shown in FIG. 17(*b*).

Embodiments of the present invention are not limited to implementation in field programmable gate arrays (FPGA). Further embodiments of the present invention may utilize other hardware structures, including but not limited to Application-Specific Integrated Circuits (ASIC), adaptive array processing and passive array processing. Software processes may also be utilized in implementing embodiments of the present invention. Application of embodiments of the present invention is wide ranging, also including but not limited to beamforming and other filtering techniques, and for use in satellite communication. It is contemplated that numerous modifications may be made to the embodiments and implementations of the present invention without departing from the spirit and scope of the invention as defined in the following claims.

What is claimed is:

1. A method of implementing field programmable gate arrays in image processing and detection, comprising:
   converting a Givens rotation of a vector to a set of operations;
   performing the set of operations on input pixel streams to generate an upper triangular matrix;
   applying backsubstitution to said generated upper triangular matrix to obtain an inverse of said upper triangular matrix;
   transposing said inverse of said upper triangular matrix using distributed arithmetic;
   obtaining a filter weight vector; and
   applying finite impulse response filtering to the input pixel streams to generate an output;
   wherein a coordinate rotation digital computer operation implemented in the field programmable gate arrays is used for said converting; and said generated output indicates a detected target signature.

2. A method of implementing field programmable gate arrays in image processing and detection, comprising:
   converting a Givens rotation of a vector to a set of operations;
   generating a correlation matrix R from input pixel streams;
   applying said set of operations to convert a matrix [R|d] to an upper triangular matrix by Givens rotation, where d is a desired target signature;
   applying backsubstitution to said upper triangular matrix to obtain filter coefficients; and
   applying finite impulse response filtering to the input pixel streams to generate an output;
   wherein a coordinate rotation digital computer operation implemented in the field programmable gate arrays is used for said converting; and said correlation matrix is updated every time a new pixel arrives, and said generated output indicates a detected target signature.

3. The method implementing field programmable gate arrays in image processing and detection, comprising:
   converting a Givens rotation of a vector to a set of operations;
   applying said set of operations to received input pixel streams to generate an upper triangular matrix;
   applying backsubstitution to said generated upper triangular matrix to obtain an inverse of said upper triangular matrix; and
   applying finite impulse response filtering to the input pixel streams to generate an output;
   wherein a coordinate rotation digital computer operation implemented in the field programmable gate arrays is used for said converting; and said generated output indicates a detected target signature.

4. A method of implementing field programmable gate arrays for hyperspectral detection and classification, comprising:
   applying a coordinate rotation digital computer operation to received input pixel streams to generate an upper triangular matrix by Givens rotation;
   applying backsubstitution to said generated upper triangular matrix to obtain an inverse of said upper triangular matrix; and
   applying finite impulse response filtering to the input pixel streams to generate an output;
   wherein said generated output indicates a detected target signature.

5. The method of claim 4, further comprising:
   transposing said inverse of said upper triangular matrix using distributed arithmetic; and
   obtaining a filter weight vector;
   wherein coefficients of said finite impulse response filtering are defined by said filter weight vector.

6. The method of claim 4, further comprising generating a correlation matrix R from an input pixel stream, wherein said received data is a matrix [R|d], where d is a desired target signature.

7. A method of implementing field programmable gate arrays for hyperspectral detection and classification, comprising:
   performing Givens rotation on the input pixel streams to generate an upper triangular matrix;
   applying backsubstitution to said generated upper triangular matrix to obtain an inverse of said upper triangular matrix;
   transposing said inverse of said upper triangular matrix using distributed arithmetic;
   obtaining a filter weight vector; and
   applying finite impulse response filtering to the input pixel streams to generate an output;

wherein a coordinate rotation digital computer operation is used to perform the Givens rotation by a series of operations, and said generated output indicates a detected target signature.

8. The method of claim 7, wherein coefficients of said finite impulse response filtering are defined by said filter weight vector.

9. The method of claim 7, wherein said finite impulse response filter is $$w^* = \frac{(R_t^{upper})^{-1}[(R_t^{upper})^T]^{-1}d}{d^T(R_t^{upper})^{-1}[(R_t^{upper})^T]^{-1}d},$$

specified by an optimal weight vector $w^*$ such that
where, $R_t^{upper}$ is said upper triangular matrix and d is a desired target signature.

10. The method of claim 7, wherein said target signature is detected without knowledge of a target image background.

11. The method of claim 7, wherein said series of operations comprise shifts-adds.

12. The method of claim 7, wherein said series of operations comprise adds, ORs, XORs, and shifts.

13. The method of claim 7, wherein said upper triangular matrix is updated every time a new pixel is received from said input pixel stream.

14. The method of claim 7, wherein the field programmable gate arrays implement a constrained energy minimization operation.

15. A constrained energy minimization implementation apparatus of field programmable gate arrays, comprising:
a first module generating an upper triangular matrix based on input pixel streams;
a second module applying backsubstitution to said generated upper triangular matrix to obtain an inverse of said upper triangular matrix;
a third module transposing said inverse of said upper triangular matrix using distributed arithmetic;
a fourth module obtaining a filter weight vector; and
a fifth module filtering the input pixel streams to generate a filter output energy;
wherein said first module further comprises a plurality of coordinate rotation digital computer operation circuits performing Givens rotation on the input pixel streams.

16. The apparatus of claim 15, wherein said generated filter output energy indicates a detected target signature.

17. The apparatus of claim 15, wherein said fifth module further comprises a finite impulse response filter.

18. The apparatus of claim 17, wherein coefficients of said finite impulse response filter are defined by said filter weight vector.

19. A method of implementing field programmable gate arrays for hyperspectral detection and classification, comprising:
generating a correlation matrix R from input pixel streams;
applying a coordinate rotation digital computer algorithm to convert a matrix [R|d] to an upper triangular matrix by Givens rotation, where d is a desired target signature;
applying backsubstitution to said upper triangular matrix to obtain filter coefficients; and
applying finite impulse response filtering to the input pixel streams to generate an output;
wherein said correlation matrix is updated every time a new pixel arrives, and said generated output indicates a detected target signature.

20. The method of claim 19, wherein said generated output comprises a filter output energy $\delta_{CEM}(r)=w^T r$, where w is a weight vector, r is a vector with L dimensions, and L is a number of spectral bands.

21. The method of claim 19, wherein said target signature is detected without knowledge of a target image background.

22. The method of claim 19, wherein the field programmable gate arrays implement a constrained energy minimization operation.

23. A constrained energy minimization implementation apparatus of field programmable gate arrays, comprising:
an autocorrelator generating a correlation matrix R from input pixel streams;
a plurality of coordinate rotation digital computer circuits converting a matrix [R|d] to an upper triangular matrix by Givens rotation, where d is a desired target signature;
a backsubstitution module performing on said upper triangular matrix to obtain filter coefficients; and
an output module filtering the input pixel streams to generate an output;
wherein said correlation matrix is updated every time a new pixel arrives, and said generated output indicates a detected target signature.

24. The method of claim 23, wherein said output module comprises a finite impulse response filter.

* * * * *